United States Patent [19]

Smith

[11] 4,433,854
[45] Feb. 28, 1984

[54] INTERCHANGEABLE BALL HITCH
[75] Inventor: Jerry R. Smith, Littleton, Colo.
[73] Assignee: Innovative Research, Littleton, Colo.
[21] Appl. No.: 312,247
[22] Filed: Oct. 19, 1981
[51] Int. Cl.³ ............................................. B60D 1/06
[52] U.S. Cl. .................................. 280/511; 285/271; 403/131; 403/328; 411/348
[58] Field of Search .............. 280/511, 504, 507–510, 280/514; 285/271, 269, 91; 24/211 R, 211 N; 403/131, 129, 128, 328; 411/348

[56] References Cited
U.S. PATENT DOCUMENTS

| | | | |
|---|---|---|---|
| 2,297,182 | 9/1942 | Weiss | 280/511 |
| 2,474,360 | 6/1949 | Jimerson | 403/328 |
| 2,911,233 | 11/1959 | Riddle | 280/511 X |
| 4,201,400 | 5/1980 | Hoogenbosch | 280/511 |

Primary Examiner—Joseph F. Peters, Jr.
Assistant Examiner—Mitchell J. Hill
Attorney, Agent, or Firm—Young & Martin

[57] ABSTRACT

The interchangeable ball hitch connector apparatus of this invention includes a generally spherical ball connector adapted to engage a conventional ball hitch socket, a support base adapted for fastening on the tow bar of a vehicle for supporting the ball connector, and a spring-biased latch pin in the support base for releasably attaching the ball connector to the support base. When the ball connector is assembled with and attached to the support base, the latch pin is contained entirely inside the ball connector and not exposed to damage from the socket or parts thereof on the exterior of the ball connector. A channel in the ball connector allows the latch pin to be readily unlatched from the ball connector by use of an elongated utensil, such as an ignition key.

12 Claims, 6 Drawing Figures

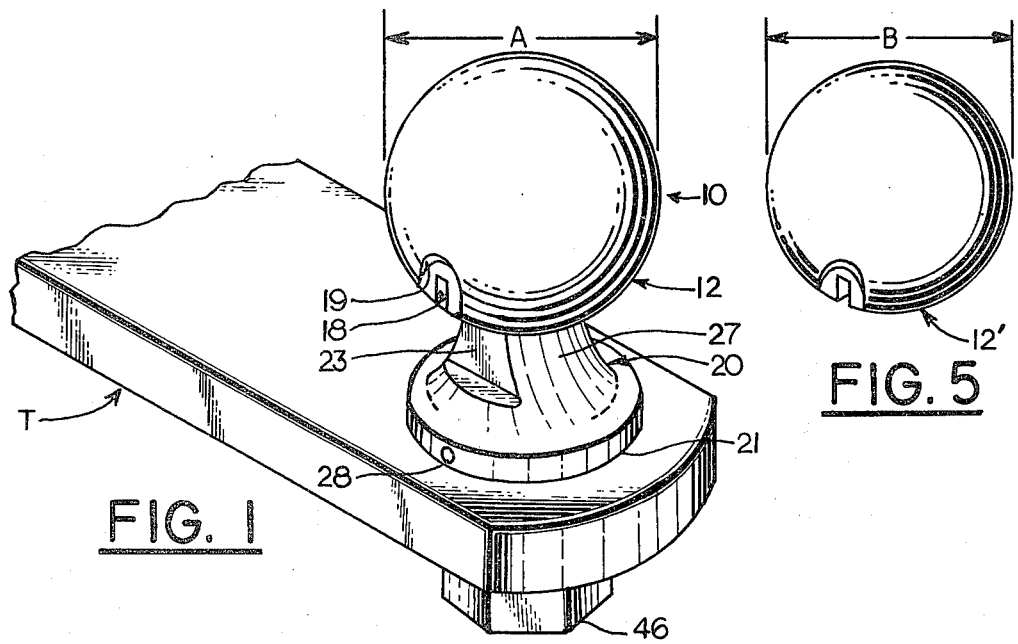
FIG. 1
FIG. 5
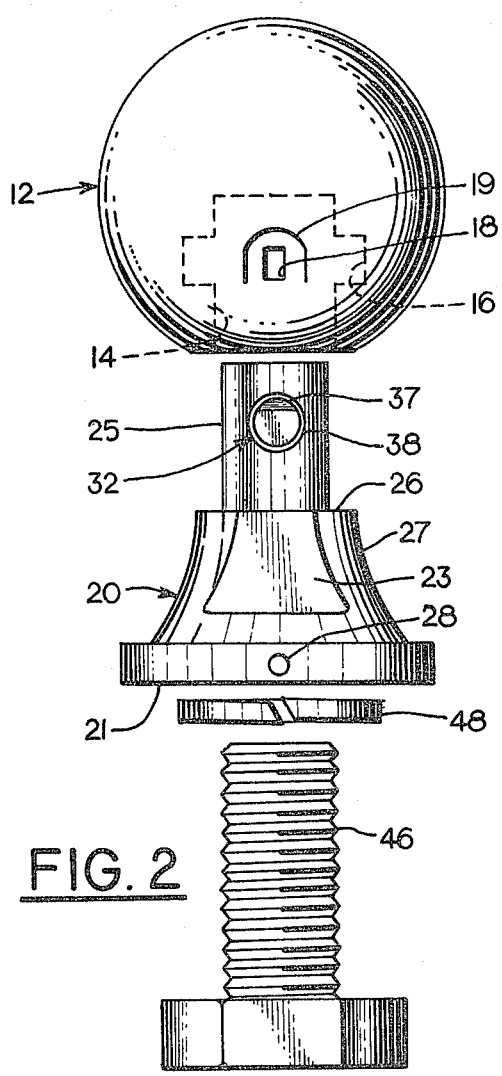
FIG. 2
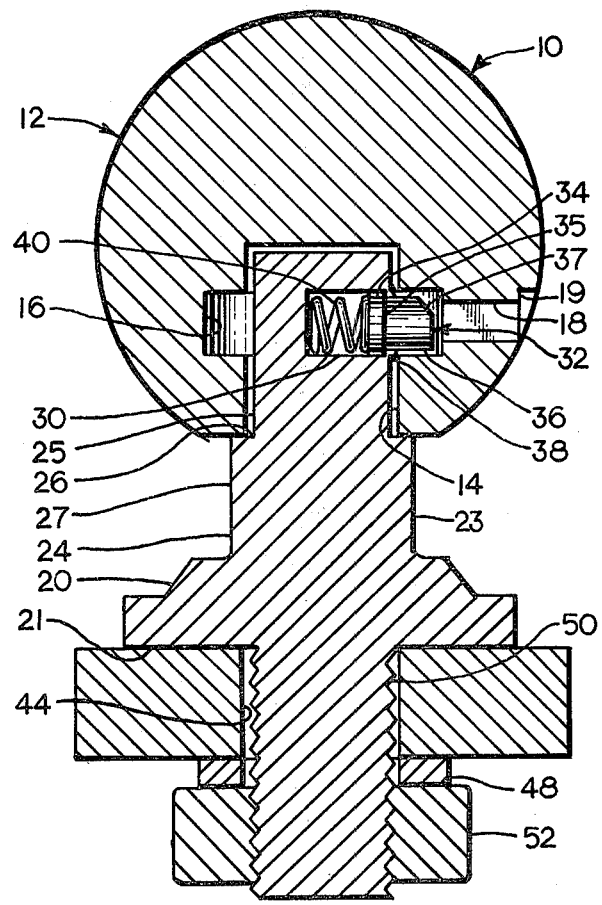
FIG. 6

INTERCHANGEABLE BALL HITCH

BACKGROUND OF THE INVENTION

The present invention is related to tow hitch devices and more particularly to a ball hitch device having quick detachable, interchangeable ball hitch connectors.

Ball and socket hitch connectors are some of the most popular and widely used devices for connecting a vehicle to be towed, such as a trailer, to a towing vehicle, such as a car, truck or tractor. A conventional ball and socket type hitch usually includes a spherical body or ball hitch connector that is adapted for attachment to a draw bar or tow bar of a towing vehicle. The tongue or hitch of the trailer or other vehicle to be towed is equipped with a socket adapted to fit over the spherical body or ball hitch connector and includes movable and lockable jaws adapted to tighten under the spherical body to prevent the socket from being removed therefrom during towing operations. Such ball and socket hitch devices are relatively safe; they are easy to connect and disconnect, and they provide a hitch connection in which the tongue or hitch of the towed vehicle can pivot to a considerable extent in any plane about the hitch connection point.

Notwithstanding the popularity and wide acceptance of such ball and socket hitches for towing vehicles, there remains some heretofore unresolved problems with their use. One of the most pervasive and aggrevating problems arises from the fact that the size of the spherical, ball-shaped body of the ball hitch connector has to be matched rather closely with the size of the socket on the hitch or tongue of the vehicle to be towed. If the ball connector is too large for the socket, the socket will simply not fit over the ball connector and the trailer cannot be connected to the towing vehicle. On the other hand, if the spherical ball connector is too small for the socket, it might not be possible to get a secure connection of the socket to the ball connector. A severe safety hazard could result from such an insecure or ineffective connection of the trailer to the towing vehicle. Unfortunately, because of strength requirements, and in many instances purely arbitrary decisions, trailer manufacturers equip their trailers with a variety of different sized sockets. Therefore, in order to use the same towing vehicle to tow different trailers, the ball connector on the towing vehicle often must be changed to a different size.

Changing conventional ball connectors attached to tow bars of towing vehicles is not always an easy task, and it often requires large wrenches or other tools. If such tools are not available to the person at the time the ball hitch has to be changed, such a change is almost impossible. Further, it is not unusal for the bolts used to attach ball hitch connectors to tow bars of vehicles to become severly damaged due to dragging on pavement, rocks and the like when the vehicle is driven through dips or over rough roads. When such damage occurs, removal of the ball connectors can be a very difficult task even with the proper tools available.

SUMMARY OF THE INVENTION

Accordingly, it is an object of the present invention to provide a novel towing hitch which includes an easily detachable and interchangeable ball connector for tow bars on towing vehicles.

It is also an object of the present invention to provide ball hitch connector apparatus for towing vehicles, including a variety of different sized ball connectors that can be easily detached from the tow bar and replaced with a ball connector of another selected size.

It is a further object of the present invention to provide an apparatus in which a ball hitch connector is provided that can be detached from the tow bar of a towing vehicle with the use of common utensils usually available to the operator of a towing vehicle.

It is also an object of the present invention to provide an easily detachable and interchangeable ball hitch connector for towing vehicles which is safe and not subject to wear or damage during use.

Another object of the present invention is to provide ball hitch connector apparatus that includes a base which is more or less permanently mounted on the tow bar of a vehicle and a ball connector that is easily attached to and detached from the base wherein a latch mechanism is positioned inside the ball connector so that it is not exposed or subject to damage or wear from external parts or forces.

The ball hitch apparatus of the present invention includes a generally spherically shaped ball connector adapted for detachable hitching to a conventional ball hitch socket of a vehicle to be towed, a base support for supporting the ball connector, and a releasable attachment mechanism for releasably attaching the ball connector to the base support. The base support is adapted for attachment in a more or less semi-permanent manner to a tow bar of a towing vehicle. The releasable attachment mechanism is generally positioned in the interior of the ball connector to prevent it from damage or wear from external parts or forces while it is mounted on the towing vehicle or during use in towing a trailer. More specifically, the attachment mechanism includes a bore extending radially inward from the bottom peripheral surface of the ball connector, and the base support includes an upwardly extending stub shaft adapted for insertion into the bore in the ball connector. A slidable latch pin in the stub shaft is adapted to protrude outwardly into engagement with an annular groove or cavity in the interior of the spherical body around the radial bore therein. The latch pin is biased to engage the spherical body, and can be disengaged from the spherical body by a force directed thereon to push the latch pin out of the annular cavity and into the stub shaft. A channel is provided in the spherical body extending from the exterior surface thereof into the cavity in axial alignment with the latch pin. A small elongated utensil, such as an ignition key, can be inserted into the channel to depress the latch pin and thereby allow the spherical body to be removed from the support base. When the ball connector is removed, it can be replaced on the base support by another ball connector of a different size as desired.

BRIEF DESCRIPTION OF THE DRAWINGS

Other objects, advantages and capabilities of the present invention will become more apparent as the description proceeds, taken in conjunction with the drawings, in which:

FIG. 1 is a perspective view of the interchangeable ball hitch connector of the present invention attached to a tow bar of a towing vehicle with two different-sized spherical ball hitches;

FIG. 2 is a view of the interchangeable ball hitch connector of the present invention with the component parts thereof separated but in alignment for assembly;

FIG. 5 is a perspective view of an alternate spherical ball of a different diameter.

FIG. 6 is a cross sectional view of an alternate embodiment of the invention having an externally threaded shank.

DETAILED DESCRIPTION OF THE PREFERRED EMBODIMENT

Figure 3:
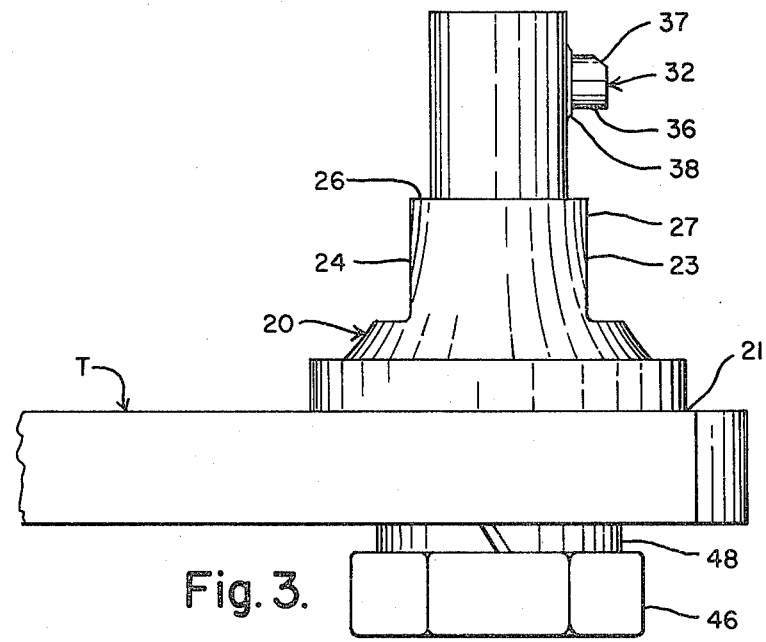
FIG. 3 is a side elevation view of the base support and latch pin assembly shown attached to a tow bar of a towing vehicle.

The interchangeable ball hitch connector 10 of the present invention is comprised of four main components, including a generally spherical body or ball connector 12 having an overall diameter A, a support base 20 for supporting the ball connector 12, a fastener device such as the bolt 46 for semi-permanently attaching the base support 20 to a tow bar T of a vehicle, and an internal releasable attachment mechanism for releasably attaching the ball connector 12 to the support base 20. The ball connector 12, of course, is of the type adapted for connection to a conventional ball hitch socket (not shown) mounted conventionally on the tongue or hitch of a trailer or other vehicle to be towed.

Figure 4:
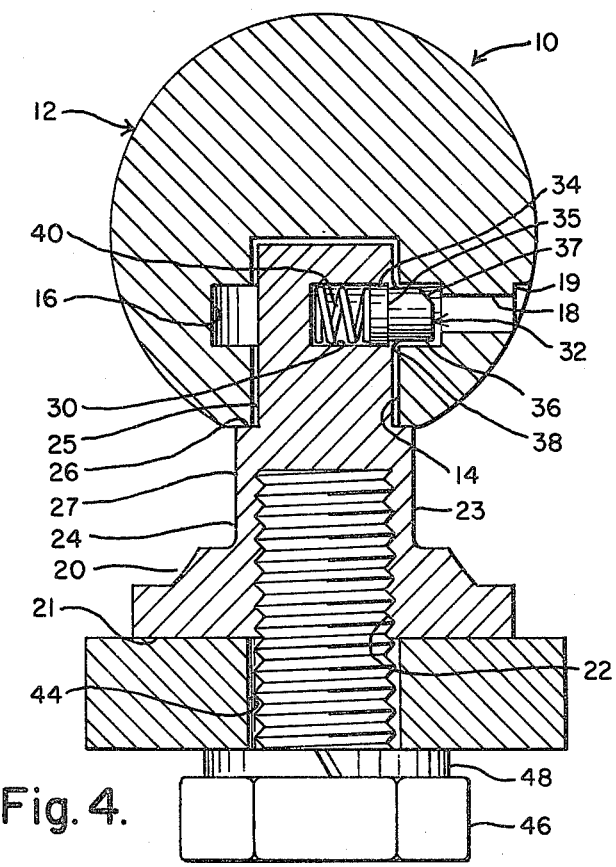
FIG. 4 is a cross-sectional view of the interchangeable ball hitch connector of the present invention mounted on a tow bar of a towing vehicle and showing the releasable attachment mechanism inside the spherical ball hitch connector.

The support base 20 includes a large flat bottom portion 21 and is tapered upwardly to form a narrower neck portion 27, and it terminates on top in an upright stub shaft 25. The stub shaft 25 is smaller in diameter than the upper portion of the neck 27 such that an annular collar 26 is formed around the base of the stub shaft 25. An internally threaded bore 22 extends upwardly into the support base 20 from the flat bottom 21 and is adapted to receive a similarly sized externally threaded bolt 46. As best seen in FIGS. 3 and 4, the bolt 46 is screwed into the internally threaded bore 22 in the support base 20 to attach the support base 20 securely to a tow bar T of a vehicle in a more or less semi-permanent manner. The bolt 46 extends upwardly through a hole 44 in the tow bar T, and a lock washer 48 is used to secure the bolt 46 against being unscrewed. Of course, an externally threaded stud 50 with a nut 52 or any other suitable apparatus can also be used to fasten the base support 20 securely to the tow bar T.

The stub shaft 25 is provided with a transverse bore 30 extending therein from a lateral side. A latch pin 32 is slidably positioned in the transverse bore 30 and is biased to protrude outwardly by a spring 40 positioned in the bore 30 behind the latch pin 32. Latch pin 32 has an enlarged portion 34 of a diameter approximately the same as the diameter of the bore 30, and a smaller diameter outer portion 36 which protrudes outwardly from the bore 30. A collar 35 is formed where the smaller portion 36 of the latch pin 32 extends outwardly from the larger portion 35. After the pin 32 is positioned in the bore 30, a portion of the shaft material 38 around the opening of the bore 30 is crimped to a diameter smaller than the larger portion 34 of the latch pin 32. The collar 35 bears against this crimped portion 38 and retains the latch pin 32 in the bore 30. Therefore, the latch pin 32 can be slid back and forth within the bore 30 against the bias of spring 40, but the crimp 38 keeps the latch pin 32 assembled in the stub shaft 25.

The spherical body 12 is provided with a radial bore 14 extending inwardly from the bottom thereof a distance approximately equal to the length of the stub shaft 25 and of a diameter sufficient to receive the stub shaft 25 therein. An annular groove or cavity 16 is formed around the inside of the bore 14 in a position to receive the latch pin 32 therein when the bottom of the spherical body 12 is positioned on the annular collar 26. Therefore, when the latch pin 32 is depressed into bore 30, the spherical body 12 can be positioned over the stub shaft 25. The distal end of latch pin 32 is chamferred at 37 to assist in initially positioning the spherical ball connectors 12 over the stub shaft 25. As the bottom of the spherical body 12 approaches the collar 26, the bias of spring 40 pushes the latch pin 32 outwardly and into the annular cavity 16 inside the spherical body 12. In this position, the spherical body 12 can be rotated about the longitudinal axis of stub shaft 25; however, as long as the latch pin 32 is engaged in the annular cavity 16, the spherical body 12 cannot be removed from stub shaft 25. In this position, the ball hitch 10 of the present invention cab be used to tow a trailer.

As best shown in FIGS. 2 and 4, the spherical body 12 is also provided with a channel opening 18 extending from the lateral side of the spherical body 12 into the annular cavity 16. Therefore when the spherical body 12 is rotated to align the channel 18 with the latch pin 32, an elongated object, such as an ignition key, small screw-driver, nail or other similar utensil can be inserted through the channel 18 to depress latch pin 32 into the bore 30. A mark 28 can be provided on a readily visible portion of the support base 20 in alignment with the latch pin 32 to assist a user in aligning the channel 18 with the latch pin when it is desired to remove the spherical body 12. Of course, with the latch pin 32 depressed into the bore 30, the spherical body 12 can be removed easily from the stub shaft 25.

With the spherical body 12 unlatched and removed from the support base 20, another spherical body 12 of a different overall diameter B but with the same sized radial bore 14 and annular cavity 16 can be positioned on and latched to the support base 20 to accommodate a different size trailer hitch socket. It is contemplated that this invention can include a plurality of spherical bodies 12 with different sized diameters that can be interchanged and attached to the support base 20 to accommodate various sized trailer hitch sockets.

As shown in FIGS. 2 and 4, the opening to channel 18 is preferably recessed from the peripheral surface of the spherical body 12 as shown at 19 to prevent wear on the external surface from parts of a hitch socket or clamp from riveting or closing the entrance to the channel 18. Therefore, the entire latch mechanism and access thereto for unlatching is protected from damage or wear due to external forces normally applied to ball hitch type towing apparatus in conventional use.

Although the present invention has been described with a certain degree of particularity, it is understood that the present disclosure has been made for clarity and example and that changes in details of structure may be made without departing from the scope of the claims hereof.

What I claim is:
1. Ball hitch apparatus, comprising:
   a support base having a stub shaft extending upwardly therefrom;

a latch pin in said stub shaft adapted to protrude radially outwardly therefrom; and a generally spherical body with a bore extending radially inward from its bottom peripheral surface, and a cavity recessed therein from the periphery of said radial bore and adapted to receive therein said latch pin when the stub shaft of said support base is inserted into said radial bore in said spherical body.

2. The ball hitch apparatus of claim 1, wherein said stub shaft includes a transverse bore extending radially therein and said latch pin is positioned slidably in said transverse bore and biased to protrude outwardly from said transverse bore into said cavity in said spherical body.

3. The ball hitch apparatus of claim 2, wherein said cavity is an annular groove in said spherical body around the periphery of said radial bore in said spherical body.

4. The ball hitch apparatus of claim 2, including a slotted access opening extending transversely from the exterior of said spherical body to said cavity and positioned to be in alignment with said latch pin when said latch pin is positioned in said cavity in such a manner that an elongated object can be inserted through said slotted access opening to depress said latch pin into said transverse bore in said shaft.

5. The ball hitch apparatus of claim 3, including a slotted access opening extending transversely from the exterior of said spherical body to said annular groove and adapted for receiving therein an elongated object for depressing said latch pin into said transverse bore in said shaft.

6. The ball hitch apparatus of claim 5, wherein said shaft has a longitudinal axis and said spherical body is rotatable about the longitudinal axis of said shaft.

7. The ball hitch apparatus of claim 6, including an external marker on said base support means in alignment with said latch pin and visible when said spherical body is positioned on said stub shaft for indicating a position where said slotted access opening in said spherical body is aligned with said latch pin.

8. The ball hitch apparatus of claim 5, wherein the external entrance to said slotted access opening is recessed inwardly from the peripheral surface of said spherical body.

9. The ball hitch apparatus of claim 3, wherein said base support means includes fastening means adapted for affixing said base support means to a tow bar of a vehicle.

10. The ball hitch apparatus of claim 9, wherein said fastening means includes an internally threaded bore in said base support means adapted for receiving an externally threaded bolt of sufficient length to also pass through a hole in a tow bar.

11. The ball hitch of claim 10, wherein said fastening means includes an externally threaded shank extending downwardly from said base support means adapted to pass through a hole in a tow bar.

12. The ball hitch apparatus of claim 1, wherein said shaft is adapted to receive a spherical body of a different diameter for an alternate selective mounting on the support base.

* * * * *